US011104311B2

United States Patent
Schroeder

(10) Patent No.: US 11,104,311 B2
(45) Date of Patent: Aug. 31, 2021

(54) BRAKE CONTROL SYSTEM AND BRAKE CONTROL METHOD FOR DETERMINING A BRAKING CORRECTION VALUE FOR EMERGENCY BRAKING OPERATIONS

(71) Applicant: Lucas Automotive GmbH, Koblenz (DE)

(72) Inventor: Marko Schroeder, Remagen (DE)

(73) Assignee: LUCAS AUTOMOTIVE GMBH, Koblenz (DE)

( * ) Notice: Subject to any disclaimer, the term of this patent is extended or adjusted under 35 U.S.C. 154(b) by 303 days.

(21) Appl. No.: 16/196,249

(22) Filed: Nov. 20, 2018

(65) Prior Publication Data
US 2019/0168722 A1 Jun. 6, 2019

(30) Foreign Application Priority Data
Dec. 1, 2017 (DE) ...................... 10 2017 011 139.1

(51) Int. Cl.
*B60T 7/22* (2006.01)
*B60T 8/17* (2006.01)

(52) U.S. Cl.
CPC .................... *B60T 7/22* (2013.01); *B60T 8/17* (2013.01); *B60T 2201/022* (2013.01)

(58) Field of Classification Search
CPC ........ B60T 7/22; B60T 8/17; B60T 2201/022; B60T 13/52; B60T 17/02; F04B 17/03;
(Continued)

(56) References Cited

U.S. PATENT DOCUMENTS

2013/0204501 A1* 8/2013 Keeney ........... B60W 30/18127
701/70
2015/0210280 A1* 7/2015 Agnew ............... B60W 30/095
701/48
(Continued)

FOREIGN PATENT DOCUMENTS

DE       10326562 A1    12/2004
DE   102012222545 A1     6/2014

OTHER PUBLICATIONS

Search Report for corresponding German Application Serial No. 10 2017 011 139.1, pp. 1-8.

*Primary Examiner* — Abby Y Lin
*Assistant Examiner* — Hossam M Abd el Latif
(74) *Attorney, Agent, or Firm* — Tarolli, Sundheim, Covell & Tummino LLP

(57) ABSTRACT

A brake control system adapted for use in a motor vehicle is disclosed, which brake control system is intended to determine, while an ACC device of the motor vehicle is active and based on environmental data obtained from one or more environmental sensors associated with the motor vehicle, a braking correction value for an emergency braking profile describing the braking behaviour of the motor vehicle. The environmental sensors are adapted to provide the brake control system with the environmental data representing the area in front of the motor vehicle. The brake control system is adapted to provide a target braking profile and to determine an actual braking profile on the basis of environmental data provided during an ACC braking operation. The brake control system is further adapted to compare the target braking profile with the actual braking profile and on the basis of the comparison result to determine the braking correction value. Finally, the brake control system is adapted to store the determined braking correction value for use in a (Continued)

subsequent emergency braking operation of the motor vehicle to be triggered by the brake control system.

13 Claims, 2 Drawing Sheets

(58) Field of Classification Search
CPC ....... H01M 10/0525; H01M 2004/028; H01M 4/131; H01M 4/1391; H01M 4/366; H01M 4/466; H01M 4/62; Y02E 60/10; Y02E 10/70; Y02E 10/7072; Y02E 90/14
USPC .......................................................... 701/93
See application file for complete search history.

(56) References Cited

U.S. PATENT DOCUMENTS

| 2017/0106884 A1* | 4/2017 | Oswald ................... B61L 3/008 |
| 2018/0099648 A1* | 4/2018 | Won ...................... B60T 8/3205 |
| 2019/0275993 A1* | 9/2019 | Hiromitsu ............... B60R 21/00 |
| 2019/0315322 A1* | 10/2019 | Goto ....................... B60T 13/66 |

* cited by examiner

BRAKE CONTROL SYSTEM AND BRAKE CONTROL METHOD FOR DETERMINING A BRAKING CORRECTION VALUE FOR EMERGENCY BRAKING OPERATIONS

RELATED APPLICATION

This application claims priority from German Application No. 10 2017 011 139.1, filed Dec. 1, 2017, the subject matter of which is incorporated herein by reference in its entirety.

BACKGROUND TO THE INVENTION

A brake control system and a brake control method for determining a braking correction value for a subsequent emergency braking operation are disclosed. The control system and the method are possible in particular due to the presence of ACC (Autonomous/Adaptive Cruise Control) in motor vehicles.

PRIOR ART

In modern motor vehicles, various driver assistance systems are used. Thus an emergency brake assistant is regularly provided, for example, in order to initiate an emergency braking operation automatically in hazardous situations such as the imminent collision with an obstacle located in front of a motor vehicle. The collision should be completely avoided thereby, but alternatively at least the collision speed of the motor vehicle with the obstacle should be reduced as far as possible. An emergency braking operation triggered by the emergency brake assistant normally follows a predetermined emergency braking profile in respect of trigger time and deceleration curve, which profile is determined in the system design of the pertinent motor vehicle and then stored in a motor vehicle memory for subsequent access by the emergency brake assistant. The emergency brake assistant can be part of an ACC device, for example, which relieves the driver of the motor vehicle of monitoring the distance to a motor vehicle driving in front and adapts the speed of his own motor vehicle to the speed of the motor vehicle driving in front. If the ACC device is active during the journey, it maintains the speed set by the driver or can reduce this by autonomous release of the accelerator or by braking as soon as too small a distance to the motor vehicle driving in front is detected. Recognition of the distance to the motor vehicle driving in front can take place here by means of an environmental observation system with radar and/or other suitable sensors. Taking the time conditions additionally into consideration, factors such as relative speed and relative acceleration of the motor vehicle driving in front can be determined.

It is generally desirable that an emergency braking operation is triggered neither too late nor too early, as in the first case the impending collision can only be mitigated, while in the second case an erroneous activation of the emergency braking operation takes place. This can lead to reduced driving comfort and distract the driver.

The emergency brake assistant is therefore intended to initiate the emergency braking operation at the optimal trigger time. Whether this succeeds depends substantially on the system response, thus on the real deceleration behaviour of the motor vehicle in the event of an emergency braking operation to the predetermined emergency braking profile. Since the determination of this emergency braking profile normally takes place, however, on test vehicles under (ideal) laboratory conditions with brakes and tyres as new and under the assumption of a high road friction coefficient and a low loading of the vehicle, the driving conditions prevailing at the trigger time, such as road composition, weather conditions, any vehicle component wear, situation-related vehicle weight and other factors are not known and are thus left out of consideration. This can lead to a collision with an obstacle located in front of the vehicle no longer being able to be avoided, in spite of a theoretically optimally selected trigger time for an emergency braking operation with the predetermined emergency braking profile, as the speed reduction required for this is no longer achieved during the emergency braking operation.

Underlying Problem

Determining an optimal trigger time for an emergency braking operation, due to which a collision with an obstacle located in front of the motor vehicle can just be avoided, is difficult in particular on account of changing and partly unknown factors influencing the attainable (maximal) deceleration and the (maximally) attainable reduction in speed during an automatic emergency braking operation.

Proposed Solution

A brake control system adapted and intended for use in a motor vehicle determines, while an ACC device of the motor vehicle is active and based on environmental data obtained from one or more environmental sensors associated with the motor vehicle, a braking correction value for an emergency braking profile describing the braking behaviour of the motor vehicle. The environmental sensors are adapted to provide the brake control system with the environmental data representing the area in front of the motor vehicle. The brake control system is adapted to provide a target braking profile and to determine an actual braking profile on the basis of the environmental data provided during an ACC braking operation. The brake control system is further adapted to compare the target braking profile with the actual braking profile and to determine the braking correction value on the basis of the comparison result. Finally, the brake control system is adapted to store the determined braking correction value for use for a subsequent emergency braking operation of the motor vehicle to be triggered by the brake control system.

Further Configurations and Advantageous Further Developments

The emergency braking profile can be a deceleration profile, which describes one or more deceleration values for the motor vehicle to be maximally attained during the emergency braking operation.

The target braking profile can include one or more deceleration values or values connected thereto such as brake pressure values, which guarantee a suitable deceleration of the motor vehicle during an ACC braking operation.

Both the emergency braking profile and the target braking profile can contain defined path and time settings for the emergency braking operation and the ACC braking operation, such as a respective predetermined trigger time or/and a maximally aimed-for braking distance, or at least be dependent on one of these values.

All or some of the environmental sensors can be arranged on the front of the motor vehicle, for example centrally, but also to the front left or/and front right of the motor vehicle. In addition or alternatively, an arrangement in the central upper area of the windscreen of the motor vehicle or an arrangement in the roof area of the motor vehicle is to be realised.

The brake control system can be adapted to carry out the comparison of the target braking profile with the actual braking profile in time terms during the ACC braking operation. Alternatively it is also possible that this comparison is carried out in time terms after the ACC braking operation, or that the ACC braking operation and the comparison overlap in time.

The brake control system can further be adapted to receive brake pressure data from at least one vehicle sensor associated with the motor vehicle, and to carry out the determination of the actual braking profile on the basis of one or more deceleration values determined from the environmental data or/and on the basis of one or more brake pressure values of the motor vehicle determined from the brake pressure data.

The actual braking profile can thus be an actual deceleration profile set during the ACC operation or/and an actual brake pressure profile set during the ACC operation.

Furthermore, the brake control system can be adapted and intended to determine a trigger time for the emergency braking operation on the basis of the determined braking correction value in such a way that a collision with an object located in front of the motor vehicle is avoided, or that an expected collision speed, determined from the environmental data, with the object located in front of the motor vehicle is reduced.

In this case the brake control system can be adapted to replace the determined trigger time by a first fixed trigger time if the determined trigger time lies temporally before the first fixed trigger time, and to replace the determined trigger time by a second fixed trigger time if the determined trigger time lies temporally after the second fixed trigger time.

The first and second fixed trigger times can serve here as the earliest and latest possible trigger times, in order in particular to improve the functional safety of the occupants of the motor vehicle. Triggering of the emergency braking operation before the earliest possible trigger time would very probably lead here to an unnecessary emergency braking operation, while triggering of the emergency braking operation after the latest possible time would very probably result in a collision with a vehicle driving in front of the motor vehicle or with a stationary obstacle at a residual speed hazardous for the occupants of the motor vehicle.

The brake control system can be adapted to execute at least a portion of the steps according to the proposed solution during a plurality of ACC braking operations of the motor vehicle, to compare the determined braking correction values with one another and on the basis of the comparison to determine a variable confidence factor for the subsequent emergency braking operation to be triggered by the brake control system, and to store the determined confidence factor.

In this case the brake control system can be adapted to increase the variable confidence factor if the respectively determined braking correction values substantially resemble one another. "Substantially resemble" should be understood here to mean that a discrepancy between the respectively determined braking correction values is maximally 2% or maximally 5% or maximally 10% or maximally 20%.

Alternatively or in addition, the brake control system can be adapted to provide an elapsed time or/and a travelled distance of the motor vehicle since the ACC braking operation or since the plurality of ACC braking operations, and to reduce the variable confidence factor if the elapsed time or/and the travelled distance is greater than or equal to a predetermined reference value.

The confidence factor can be described according to whether and to what extent the individual braking correction values determined correlate to one another and whether the degree of correlation determined is still representative of a currently prevailing driving situation of the motor vehicle.

The brake control system can be adapted to determine, based on the value of the variable confidence factor, that the determined braking correction value is not used for the subsequent emergency braking operation to be triggered by the brake control system if the value of the variable confidence factor is smaller than a first threshold value.

Alternatively to this, the brake control system can be adapted to determine, based on the value of the variable confidence factor, that the determined braking correction value is used for the subsequent emergency braking operation to be triggered by the brake control system, taking a weighting factor into account, if the value of the variable confidence factor lies in a range that is greater than or equal to the first threshold value and smaller than a second threshold value.

Further alternatively to this, the brake control system can be adapted to determine, based on the value of the variable confidence factor, that the determined braking correction value is used for the subsequent emergency braking operation to be triggered by the brake control system if the value of the variable confidence factor is greater than or equal to the second threshold value.

In principle, therefore, the probability can increase—as the confidence factor grows—that the determined braking correction value is used in the context of the subsequent emergency braking operation, while a declining confidence factor can reduce this probability.

The weighting factor can shift between 0 and 1, for example, and likewise increase as the confidence factor increases. A confidence factor that assumes exactly the first threshold value would thus entail a weighting factor of 0, while a confidence factor that lies just below the second threshold value would entail a weighting factor of just below 1. In between, the weighting factor can assume linear values or follow a suitable function. The brake control system can be adapted to provide a signal at the determined trigger time, which signal triggers the subsequent emergency braking operation using the emergency braking profile.

In the brake control system, radar, lidar, ultrasonic or/and video sensors can be provided as environmental sensors for recording the environmental data, in order to provide the brake control system with the environmental data representing the area in front of the motor vehicle.

A brake control method for determining in a motor vehicle, while an ACC device of the motor vehicle is active, a braking correction value for a target braking profile describing the braking behaviour of the motor vehicle, based on environmental data obtained from one or more environmental sensors associated with the motor vehicle, wherein the environmental sensors provide the environmental data representing the area in front of the motor vehicle, comprises providing the target braking profile and determining an actual braking profile on the basis of the environmental data provided during an ACC braking operation.

The brake control method further comprises comparison of the target braking profile with the actual braking profile and determination of the braking correction value on the basis of the result of the comparison. Finally, the brake control method comprises storage of the determined braking correction value for use for a subsequent emergency braking operation to be triggered.

BRIEF DESCRIPTION OF THE DRAWING

Other aims, features, advantages and application possibilities result from the following description of exemplary embodiments, which are not to be understood as restrictive, with reference to the following figures. Here all features described and/or depicted show by themselves or in any combination the object disclosed here, even independently of their grouping in the claims or their retroactive applications. The dimensions and proportions of the components shown in the figures are not necessarily to scale here and may deviate from what is illustrated here in embodiments to be implemented.

DETAILED DESCRIPTION OF THE DRAWINGS

In the context of the following disclosure, certain aspects are described primarily with reference to the brake control system. However, all these described aspects are also applicable in the context of the disclosed brake control method, which can be executed by a central control apparatus of a motor vehicle, for example. This can take place by making suitable write and read accesses to an internal or/and external memory associated with the motor vehicle. The brake control method can be implemented inside the motor vehicle both in hardware and software or a combination of hardware and software. These also include digital signal processors, application-specific integrated circuits, field-programmable gate arrays and other suitable switching and arithmetic components.

Figure 1:
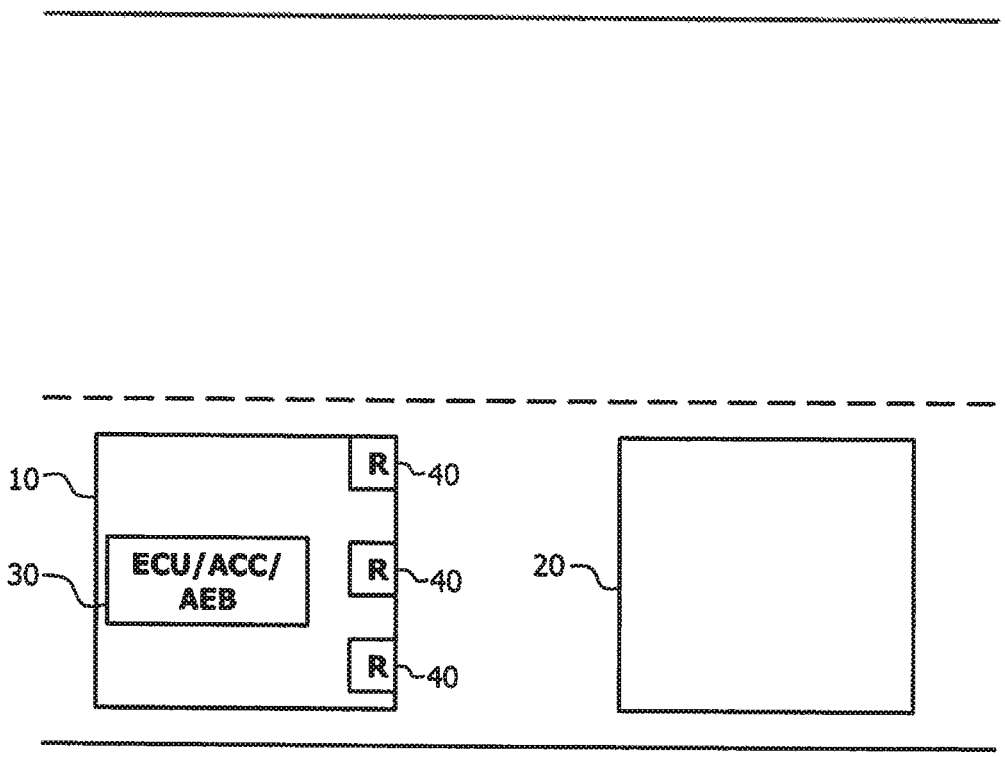
FIG. 1 shows schematically a driving situation in which a specified distance is kept constant between a motor vehicle driving in front and the own motor vehicle with the use of an ACC device.

Reference is made first to FIG. 1. Shown schematically there is a typical traffic situation, in which an own motor vehicle 10 (in the following also vehicle 10) drives behind another motor vehicle 20.

The own vehicle 10 comprises an electronic control system 30, to which signals are supplied and which records and processes environmental data and generates control or output signals. The electronic control system 30 here comprises a main control unit (ECU), a control unit for an ACC device (ACC) and a control unit for an emergency brake assistant, which can request or trigger an automatic emergency braking operation (AEB). The last two named control units can also be integrated respectively in a separate control system or be combined in a brake control unit outside the ECU.

The vehicle 10 here further comprises as an example three radar sensors 40, which are arranged laterally at the front in the right and left corner areas and in a central front area of the own vehicle 10. The number of radar sensors is not limited here to three, it can also be 1, 2, 4 or more, for example.

In the present example, the three radar sensors 40 cover different monitoring areas, which can partially overlap. The radar sensors 40 supply the electronic control system 30 (also brake control system 30 in the following) with radar signals about the distance and the differential speed between the own vehicle 10 and the motor vehicle 20 driving in front.

The brake control system 30 described here and adapted and intended for use in a motor vehicle can comprise in addition to the radar sensors 40 other environmental sensors (video, ultrasonic, lidar, etc.) if applicable to record the environment of the own vehicle 10. The brake control system 30 processes the environmental data obtained from the one or more environmental sensor(s) (radar sensors 40) located on the motor vehicle, in order to determine a braking correction value for an emergency braking profile, which characterises the braking behaviour of the own vehicle 10. To this end the environmental sensors 40 provide the brake control system 30 with environmental data representing the area in front of the vehicle 10.

The ACC device, which is integrated according to FIG. 1 by way of example into the brake control system 30, is used to keep constant the distance between the motor vehicle 20 driving in front and the own vehicle 10. To do this, the brake control system 30 (automatically) triggers ACC braking operations, for example, for the own vehicle 10 if the vehicle 20 driving in front reduces its speed. These ACC braking operations follow a predetermined target braking profile, i.e. a predetermined deceleration or/and a predetermined speed reduction, which is to be achieved over a certain period of time or/and over a specified distance (braking distance).

Keeping the distance between the vehicles 10 and 20 constant, however, is usually only realisable if the current distance between the motor vehicle 20 driving in front and the own vehicle 10 is still great enough and/or if the vehicle 20 driving in front does not execute any emergency braking operations. If these conditions are not fulfilled, the emergency brake assistant must intervene, on the contrary, in order to prevent a collision with the vehicle 20 driving in front by triggering an emergency braking operation of the own vehicle 10. This also applies if the own vehicle 10 is driving at high speed towards a stationary obstacle such as persons or a wall, for example, or if the own vehicle 10 meets another motor vehicle on the same lane. Although the latter two cases are not shown in FIG. 1, they are also covered by the present disclosure.

The brake control system 30 is adapted to trigger an emergency braking operation in such a case, which follows an emergency braking profile determined during the system design of the own vehicle 10. Here a maximal deceleration of the own vehicle 10 is aspired to, which can lie, for example, between 3 m/s$^2$ and 8 m/s$^2$. A maximal deceleration of the own vehicle 10 should not in any case be higher than 10 m/s$^2$. The emergency braking profile can already contain, for example, a predetermined trigger time for the emergency braking operation, which time can also be a function of other parameters such as the relative speed with regard to the vehicle 20 driving in front. This predetermined trigger time should not be confused with the (optimal) trigger time to be determined in the context of this disclosure, which can if applicable replace the preset trigger time.

The brake control system 30 is thus adapted to meet or to determine an optimal trigger time for the emergency braking operation of the own vehicle 10. The optimal trigger time for the emergency braking operation is here defined by the fact that a collision with an object located in front of the own vehicle 10 (for example, the vehicle 20 driving in front, an approaching vehicle or any immobile object) is just prevented. Since in some situations this is no longer possible because a distance is already too small, the ideal trigger point is further defined by the fact that an expected collision speed with the object located in front of the vehicle is reduced as sharply as possible. The expected collision speed can be determined, for example, by the brake control system 30 from the environmental data.

To determine the optimal trigger time, the environmental sensors 40 first record, while the ACC device is active, thus during an ACC braking operation, for example, the area in front of the own motor vehicle 10 continuously or at discrete times to determine parameters about the driving situation of the vehicle 20 driving in front. These parameters include, for example, the speed and the location as a function of time of the vehicle 20 driving in front.

The brake control system 30 can access these parameters and compile an actual braking profile from them. In addition, the control system can access other parameters, such as brake force or/and brake pressure, which set in during a braking operation of the own motor vehicle 10. These parameters are provided by one or more vehicle sensors associated with the own motor vehicle 10. The vehicle sensors can be sensors, for example, which determine brake pressures in one or more wheel cylinders and/or in the main cylinder of the own motor vehicle 10. These parameters can also enter into the determination of the actual braking profile. The actual braking profile accordingly contains the deceleration values actually resulting during the ACC braking operation in question or/and variables related thereto, with which the respective deceleration values can be depicted or at least calculated.

The brake control system 30 compares the actual braking profile determined for the preceding braking operation with the target braking profile. This comparison can comprise, for example, forming the difference between the target braking profile and the actual braking profile. The brake control system then determines a braking correction value on the basis of the comparison result and stores this in the memory associated with the own vehicle 10. This can be any suitable internal vehicle memory, but also an external memory, which the brake control system 30 can access by means of suitable communications means. The braking correction value in this case contains at least one time indication, which—when applying the braking correction value to the emergency braking profile—leads to a time shift of the trigger time of the emergency braking operation. This time-shifted trigger time then represents the determined optimal trigger time.

Figure 2:
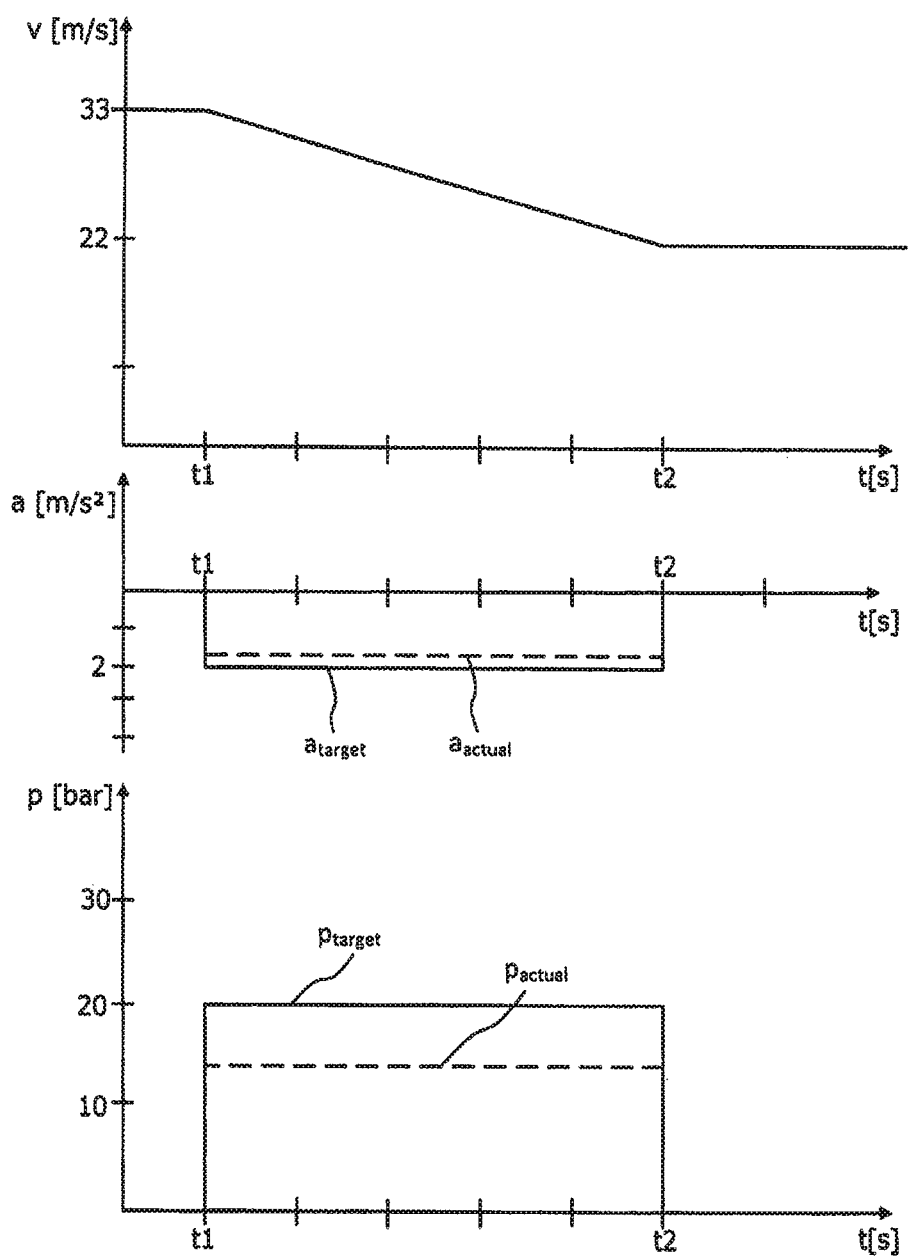
FIG. 2 shows schematically three diagrams, which depict exemplary curves of speed (top diagram), target deceleration and actual deceleration (middle diagram) and target brake pressure and actual brake pressure (bottom diagram) of the own motor vehicle between two times t1 and t2.

FIG. 2 shows three exemplary diagrams, which serve for a better understanding of how the braking correction value and as a result the optimal trigger time for the emergency braking operation are determined. Here the top diagram shows the driving speed of the own vehicle 10 over the time, wherein the driving speed is to be reduced between the times t1 and t2 from around 33 m/s (corresponding to 120 km/h) to 22 m/s (corresponding to 80 km/h), for example because the vehicle 20 driving in front is driving at a speed of 80 km/h. For illustration purposes it is assumed here that the speed between the times t1 and t2 is to decrease linearly and that the speed of the vehicle 20 driving in front remains unchanged in the time period considered. Naturally braking correction value and trigger time can be determined by the brake control system 30 even if the vehicle 20 driving in front changes its speed in the time period considered or/and if the deceleration is not to remain constant, as shown in the middle diagram in FIG. 2, but follows another predetermined deceleration profile (target braking profile), for example.

The assumed time values in the present example are t1=1 s and t2=6 s. From these values it results that the own vehicle 10, prompted by the brake control system 30, must between the times t1 and t2 attain the aforementioned constant acceleration of $$a = \frac{v(\Delta t)}{\Delta t} = \frac{v(t2) - v(t1)}{t2 - t1} = -\frac{11 \text{ m/s}}{5 \text{ s}} \approx -2 \text{ m/s}^2 \quad (1)$$

so that tailgating of the vehicle 20 driving in front can just be prevented. This negative acceleration (deceleration) is shown in the middle diagram in FIG. 2 as a continuous line and represents the target deceleration for the braking operation during the times t1 and t2. It is determined or/and provided by the brake control system in the form of the target braking profile $a_{target}$.

During the braking operation, for which the target braking profile is predetermined by the brake control system 30, the actually occurring actual deceleration, thus the actual deceleration profile (or actual braking profile) $a_{actual}$ is determined, which in the present example (dashed line in the middle diagram of FIG. 2) is constant at around 1.75 m/s². If starting out from this (idealised) constant actual deceleration value, after switching the formula (1) following v(t2) and assuming the same value for the starting speed (v(t1)=33 m/s), a speed v(t2)=2.25 m/s (corresponding to 8 km/h) would be obtained, with which the own motor vehicle 10 drives up to the motor vehicle 20 driving in front; the deceleration predetermined by the target braking profile can thus not be attained.

Alternatively or in addition, the actually prevailing brake pressure, thus an actual brake pressure profile $p_{actual}$, (which likewise represents an actual braking profile), can be determined by the brake control system 30 during the braking operation. The bottom diagram in FIG. 2 shows this actual brake pressure profile $p_{actual}$ as a dashed line. Here, too, it is evident that during the braking operation, the real actual brake pressure profile $p_{actual}$ deviates downwards from a target brake pressure profile $p_{target}$ (continuous line in the bottom diagram in FIG. 2) that is predetermined or determined from the target deceleration profile $a_{target}$, for example; the own vehicle 10 thus drives up to the motor vehicle 20 driving in front, as the predetermined brake pressure is not attained in the real braking situation.

There results from this the realisation that the necessary deceleration performance to reduce the speed of the own vehicle 10 to the required value before the collision with the motor vehicle 20 driving in front cannot be made available. This is critical, above all in the case of an emergency braking operation triggered by the brake control system 30, for example if the own vehicle 10 is driving towards a stationary obstacle at a certain speed and is to be braked to a stop for this reason.

In order to prevent this, the brake control system 30 compares the actual braking profiles (of the deceleration and/or the brake pressure) determined during the ACC braking operation with the corresponding predetermined target braking profiles and determines from this the braking correction factor, which is used to change the trigger time for an emergency braking operation in time terms. The more the target and actual profiles resemble one another (for example, up to an error of 1% or 3% or 5% or 10%), the smaller the braking correction factor will be, as the required deceleration performance in such a case can indeed be approximately delivered. However, if the target and actual profiles differ sharply from one another (for example, by more than 10% or more than 20% or more than 30% or more than 50%), this leads to a comparatively high braking correction factor. If the braking correction factor is used in a subsequent emergency braking operation triggered by the brake control system, the trigger time of the emergency braking profile can be changed by this, for example.

The application of the braking correction factor to the emergency braking profile can comprise various suitable operations such as addition, subtraction, multiplication, division, the formation of various mean values (arithmetic mean, root mean square, median, logarithmic mean, weighted average) etc.

The brake control system 30 is also adapted to set specified limit values for the trigger time of the emergency braking operation, so that the determined trigger time at least always moves in a defined time range between an earliest and a latest permitted trigger time. For this the brake control system 30 replaces the determined trigger time with a fixed early limit time for the trigger time if the determined trigger time lies temporally before the early limit time. In the same way, the brake control system 30 replaces the determined trigger time with a fixed late limit time for the trigger time if the determined trigger time lies temporally after the late limit time. The early and late limit times can each be stored in the memory associated with the vehicle.

The brake control system 30 can carry out the determination of the braking correction value not only for a single, but also for several ACC braking operations. For example, braking correction values can be determined according to the scheme described (or parts thereof) for all ACC braking operations (or also for a certain partial number thereof) that the own vehicle 10 executes, prompted by the brake control system 30. This makes possible the formation of a degree of confidence, thus of a factor, that determines the extent to which the braking correction value or values determined are still representative of a current driving situation of the own motor vehicle 10, in which an emergency braking operation is to be triggered by the brake control system 30. This takes account of the circumstance that all prevailing driving conditions exert influence on a braking operation. For example, let there be cited here the wear of brakes and/or tyres and/or of other components of the brake system of the own vehicle 10, a change in the road surface friction coefficient on account of changing road surface (gravel, concrete, leaves) or changing weather conditions (sun, rain, ice) as well as a change in the vehicle mass due to high or low loading.

The (confidence) factor is variable and is increased, prompted by the brake control system 30, for example, if the determined correction values of the individual ACC braking operations are identical or at least strongly resemble one another, as this speaks for identical or at least similar driving conditions between the individual braking operations. In contrast to this, the brake control system 30 causes a reduction in the confidence factor as the time increases and/or the distance covered grows since the plurality of ACC braking operations (for example, since the last of these braking operations), as a long duration/long distance lying behind the own vehicle 10 since the last determination of the braking correction value increases the probability that the driving conditions have now changed. To this end the brake control system 30 can receive or determine the time and/or the distance covered since the plurality of ACC braking operations.

It is also conceivable to let the individual ACC braking operations (and the actual braking profiles determined in this case) enter into the determination of the braking correction factor with different weighting. The brake control system 30 can provide a weighting function for this, for example, taking the actual braking profiles which lie further back in one of the dimensions of path or time from the viewpoint of a current driving situation into consideration to a lesser extent for determining the braking correction factor, while more recent actual braking profiles are taken more strongly into consideration with regard to the current driving situation.

Finally, the brake control system 30 is adapted to decide, on the basis of the current confidence factor in a prevailing driving situation, whether the braking correction value is applied to the emergency braking profile in the case of an imminent emergency braking operation. Two threshold values for the confidence factor are provided for this. If the confidence factor is so small that it lies below both threshold values, the braking correction value cannot be used for the emergency braking operation. If the confidence factor is so high, however, that it lies above both threshold values or is at least as high as the upper of the two threshold values, the braking correction value can be used for the subsequent emergency braking operation. If the confidence factor is equal to the lower of the two threshold values or it lies between these, the brake control system 30 can execute a weighting here also, thus use the braking correction value for the emergency braking operation taking a weighting factor into account.

The brake control system 30 and the brake control method disclosed here are used to teach an automatic emergency brake assistant of a motor vehicle the vehicle deceleration attainable during an emergency braking operation in the context of ACC braking operations, instead of merely accessing the ideal vehicle deceleration determined during the system design of the vehicle. The ideal trigger time of the emergency braking operation can thus be determined more exactly and any collisions prevented more reliably.

The variants described above and their structural and operational aspects serve only for a better understanding of the structure, mode of operation and properties; they do not restrict the disclosure to the exemplary embodiments. The figures are partly schematic, wherein substantial properties and effects are depicted in part clearly enlarged, in order to clarify the functions, active principles, technical configurations and features. Here every mode of operation, every principle, every technical configuration and every feature that is/are disclosed in the figures or in the text can be combined freely and in any way with all claims, every feature in the text and in the other figures, other modes of operation, principles, technical configurations and features that are contained in this disclosure or result from it, so that all conceivable combinations of the variants described are to be assigned. Even combinations between all individual implementations in the text, meaning in each section of the description, in the claims and even combinations between different variants in the text, in the claims and in the figures are comprised. Nor do the claims limit the disclosure and thus the combination possibilities of all features shown with one another. All disclosed features are also explicitly disclosed here individually and in combination with all other features.

The invention claimed is:

1. A brake control system (30), which is adapted for use in a motor vehicle (10) and intended to determine a braking correction value for an emergency braking profile which describes the braking behaviour of the motor vehicle (10) on the basis of environmental data obtained from one or more environmental sensors (40) associated with the motor vehicle, while an adaptive cruise control (ACC) device of the motor vehicle is active, wherein the environmental sensors are adapted to provide the brake control system (30) with the environmental data representing the area in front of the motor vehicle, and wherein the brake control system is adapted to:
- provide a target braking profile ($a_{target}$, $p_{target}$) representing ideal braking determined during the braking control system design;
- determine an actual braking profile ($a_{actual}$, $p_{actual}$) on the basis of the environmental data provided during an ACC braking operation;
- compare the target braking profile with the actual braking profile;
- determine the braking correction value on the basis of the comparison result; and
- store the determined braking correction value for use in a subsequent emergency braking operation of the motor vehicle (10) to be triggered by the brake control system (30).

2. The brake control system (30) according to claim 1, which is adapted to receive brake pressure data from at least one vehicle sensor associated with the motor vehicle (10), and to carry out the determination of the actual braking profile ($a_{actual}$, $p_{actual}$) on the basis of one or more deceleration values determined from the environmental data or/and on the basis of one or more brake pressure values of the motor vehicle determined from the brake pressure data.

3. The brake control system (30) according to claim 1, which is adapted and intended to determine a trigger time for the emergency braking operation on the basis of the determined braking correction value in such a way that a collision with an object (20) located in front of the motor vehicle (10) is avoided, or that an expected collision speed with the object located in front of the motor vehicle, which speed is determined from the environmental data, is reduced.

4. The brake control system (30) according to claim 3, which is adapted to replace the determined trigger time by a first fixed trigger time if the determined trigger time lies temporally before the first fixed trigger time, and to replace the determined trigger time by a second fixed trigger time if the determined trigger time lies temporally after the second fixed trigger time.

5. The brake control system (30) according to claim 1, which is adapted to carry out at least a portion of the steps according to claim 1 during a plurality of ACC braking operations of the motor vehicle (10), to compare the determined braking correction values with one another and on the basis of the comparison to determine a variable confidence factor for the subsequent emergency braking operation to be triggered by the brake control system, and to store the determined confidence factor.

6. The brake control system (30) according to claim 5, which is adapted to increase the variable confidence factor if the respectively determined braking correction values substantially resemble one another.

7. The brake control system (30) according to claim 5, which is adapted to provide an elapsed time or/and a travelled distance of the motor vehicle since the ACC braking operation or since the plurality of ACC braking operations, and to reduce the variable confidence factor if the elapsed time or/and the travelled distance is greater than or equal to a predetermined reference value.

8. The brake control system (30) according to claim 5, which is adapted to determine, based on the value of the variable confidence factor, that the determined braking correction value for the subsequent emergency braking operation to be triggered by the brake control system:
- is not used if the value of the variable confidence factor is smaller than a first threshold value;
- is used, taking a weighting factor into account, if the value of the variable confidence factor lies in a range that is greater than or equal to the first threshold value and smaller than a second threshold value; and
- is used if the value of the variable confidence factor is greater than or equal to the second threshold value.

9. The brake control system (30) according to claim 3, which is adapted to provide a signal at the determined trigger time, which signal triggers the subsequent emergency braking operation using the emergency braking profile.

10. The brake control system (30) according to claim 1, in which radar, lidar, ultrasonic or/and video sensors are provided as environmental sensors (40) for detecting the environmental data, in order to provide the brake control system with the environmental data representing the area in front of the motor vehicle (10).

11. A brake control method in order to determine in a motor vehicle (10) a braking correction value for an emergency braking profile which describes the braking behaviour of the motor vehicle on the basis of environmental data obtained from one or more environmental sensors (40) associated with the motor vehicle, while an ACC device of the motor vehicle is active, wherein the environmental sensors provide the environmental data representing the area in front of the motor vehicle (10), and wherein the brake control method comprises the following steps:
- provision of a target braking profile ($a_{target}$, $p_{target}$) representing ideal braking determined during the braking control system design;
- determination of an actual braking profile ($a_{actual}$, $p_{actual}$) on the basis of the environmental data provided during an ACC braking operation;
- comparison of the target braking profile with the actual braking profile;
- determination of the braking correction value on the basis of the comparison result; and
- storage of the determined braking correction value for use in a subsequent emergency braking operation to be triggered.

12. The brake control method according to claim 11, wherein the correction value accounts for differences in driving conditions between an ideal setting and the emergency braking operation.

13. The brake control system according to claim 1, wherein the correction value accounts for differences in driving conditions between an ideal setting and the emergency braking operation.

* * * * *